United States Patent
Wang et al.

(10) Patent No.: US 10,928,796 B2
(45) Date of Patent: Feb. 23, 2021

(54) INDUCTION TRASH CAN CIRCUIT STANDBY POWER-SAVING METHOD

(71) Applicant: FUJIAN NASHIDA ELECTRONIC INCORPORATED COMPANY, Fujian (CN)

(72) Inventors: Xin Wang, Fuzhou (CN); Jiangqun Chen, Fuzhou (CN); Zhou Lin, Fuzhou (CN)

(73) Assignees: Nine Stars Group (U.S.A.) Inc., Chino, CA (US); Fujian Nashida Electronic Incorporated Company, Fujian (CN)

( * ) Notice: Subject to any disclaimer, the term of this patent is extended or adjusted under 35 U.S.C. 154(b) by 46 days.

(21) Appl. No.: 16/315,652

(22) PCT Filed: Jul. 17, 2017

(86) PCT No.: PCT/CN2017/093119
§ 371 (c)(1),
(2) Date: Jan. 6, 2019

(87) PCT Pub. No.: WO2018/184317
PCT Pub. Date: Oct. 11, 2018

(65) Prior Publication Data
US 2019/0250579 A1    Aug. 15, 2019

(30) Foreign Application Priority Data
Apr. 7, 2017   (CN) .......................... 2017 1 0223843

(51) Int. Cl.
*G05B 19/042* (2006.01)
*G06F 1/3234* (2019.01)
*B65F 1/00* (2006.01)

(52) U.S. Cl.
CPC ............ *G05B 19/0423* (2013.01); *B65F 1/00* (2013.01); *G05B 19/042* (2013.01); *G06F 1/3234* (2013.01); *B65F 2210/168* (2013.01)

(58) Field of Classification Search
CPC ................................................. G05B 19/0426
(Continued)

(56) References Cited

U.S. PATENT DOCUMENTS 4,207,466 A * 6/1980 Drage .................. H03K 17/941
                                                      250/338.1
6,974,948 B1 * 12/2005 Brent ....................... G01V 8/20
                                                        250/221

(Continued)

FOREIGN PATENT DOCUMENTS

GB           2466492 A *  6/2010  ........... G06F 1/3203

OTHER PUBLICATIONS

ITouchless, "Touchless Trashcan", 2004, iTouchless, pp. 6 (Year: 2004).*

Primary Examiner — Suresh Suryawanshi
(74) Attorney, Agent, or Firm — Raymond Y. Chan; David and Raymond Patent Firm

(57) ABSTRACT

An induction trash can circuit includes an active infrared sensor, a microcontroller, a driving circuit and a motor for controlling the opening and closing of a lid. The power-saving method is achieved through the following steps: in a standby state, the microcontroller controls the active infrared sensor to emit an infrared pulse signal to an induction area; if no obstacle exit in the induction area, the active infrared sensor outputs no signals, the program of the microcontroller immediately enters a sleep state; after the program of the microcontroller sleeps for a period of time, a watchdog timer in the microcontroller wakes up the microcomputer controller to make the microcontroller re-
(Continued)

enter a working state; and if the microcontroller is in a standby state, the above process is repeated.

12 Claims, 3 Drawing Sheets

(58) Field of Classification Search
USPC .......................................................... 700/83
See application file for complete search history.

(56) References Cited

U.S. PATENT DOCUMENTS

| | | | | |
|---|---|---|---|---|
| D639,520 S | * | 6/2011 | Lin | D34/7 |
| 8,686,676 B2 | * | 4/2014 | Yang | B65F 1/1638 |
| | | | | 318/466 |
| 9,510,401 B1 | * | 11/2016 | Kost | H05B 45/14 |
| 2006/0214620 A1 | * | 9/2006 | Chan | B65F 1/1607 |
| | | | | 318/480 |
| 2007/0182551 A1 | * | 8/2007 | Yang | B65F 1/08 |
| | | | | 340/545.3 |
| 2009/0194532 A1 | * | 8/2009 | Yang | B65F 1/1638 |
| | | | | 220/211 |
| 2011/0220648 A1 | * | 9/2011 | Yang | B65F 1/1638 |
| | | | | 220/211 |
| 2013/0045005 A1 | * | 2/2013 | Nakura | H04B 10/272 |
| | | | | 398/25 |
| 2015/0249767 A1 | * | 9/2015 | Utsumi | H04N 1/00551 |
| | | | | 358/1.14 |
| 2016/0359358 A1 | * | 12/2016 | Jeong | H03K 17/79 |
| 2018/0159634 A1 | * | 6/2018 | Lo | H04B 1/16 |
| 2018/0343139 A1 | * | 11/2018 | Saxena | G05B 19/04 |

* cited by examiner

INDUCTION TRASH CAN CIRCUIT STANDBY POWER-SAVING METHOD

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a power-saving method for the standby circuit of an induction trash can.

Description of Related Arts

Conventional induction trash cans mostly apply active infrared sensing circuit and disposable battery power. The power consumption of an induction trash can consists of two parts. One is standby power consumption (when lid is motionless). The other is action power consumption (when lid moves). The daily total power consumption equals to daily standby power consumption plus daily action power consumption. The daily standby power consumption equals to the standby current multiplied by 24 hours. The daily action power consumption equals to average current of the action multiplied by action time multiplied by operation frequency of the day. The daily standby power consumption is decided by the standby current. The daily action power consumption is in direct proportion to the average current of the action, the action time, and the operation frequency of the day. For example, the standby current of the entire circuit of an induction trash can is 1.5 mA. The daily standby power consumption is 1.5 mA*24 hours=36 mAh. The average current of the action of the induction trash can is about 200 mA. The time for opening or closing the lid is 1 second. If it is utilized for 20 times a day, then the daily action power consumption will be 200 mA*2 s/3600*20 times=2.2 mAh. Hence, since the daily total power consumption equals to daily standby power consumption plus daily action power consumption, it will be 36 mAh+2.2 mAh=38.2 mAh. If an AA zinc-carbon battery, which capacity is 480 mAh, is utilized, it can only work for 480/38.2≈13 days. If an AA alkaline battery, which capacity is 1400 mAh, is utilized, it can only work for 1400/38.2≈37 days. Based on the above calculation, the daily standby power consumption is much greater than the daily action power consumption. Therefore, if one aims to reduce the power consumption of an induction trash can, he/she should mainly consider lower the standby current thereof.

SUMMARY OF THE PRESENT INVENTION

An object of the present invention is to provide a standby power-saving method for induction trash can circuit, which can greatly reduce the standby current of the induction trash can, extend the battery life, achieve an excellent power-saving effect, reduce the use cost for the users, and decrease pollution caused by used batteries.

In order to achieve the above and other objects, the technical solution of the present invention provides a standby power-saving method for induction trash can circuit. The induction trash can circuit comprises an active infrared sensor, a microcontroller, a driving circuit, a motor to open and close the lid. The microcontroller has a sleep function and a watchdog timer. The emission of the infrared pulse of the active infrared sensor is controlled by the microcontroller. The output port of the active infrared sensor is connected to the microcontroller. The power-saving method is embodied as follows.

When the induction trash can circuit is in a standby state, the microcontroller controls the active infrared sensor to emit an infrared pulse signal to the induction area. If there is no obstacle in the induction area, the active infrared sensor will not output signal. Because the microcontroller does not receive any output signal from the active infrared sensor, it will enter a sleep state. After it has slept for a preset time, the watchdog timer disposed in the microcontroller will wake up the microcontroller, so as to have the microcontroller reenter the working state and repeat the above procedure under the standby state. On the other hand, if there is an obstacle in the induction area, the active infrared sensor will output a signal. The microcontroller received the output signal from the active infrared sensor will remain in the working state and conduct the following process: utilizing the driving circuit to drive the motor to rotate forward, delaying for a few seconds after the motor has driven the lid to open, controlling the driving circuit to drive the motor to rotate backward, reentering the sleep state after the lid is closed.

According to an embodiment of the present invention, the power supply of the active infrared sensor is controlled by the microcontroller that the microcontroller will cut off the power supply of the active infrared sensor when the microcontroller enters the sleep state. When the microcontroller is woken up by the watchdog timer when the induction trash can circuit is in a standby state, the microcontroller will first restore the power supply of the active infrared sensor and delay for a preset threshold time for the active infrared sensor to enter a stable working state and then control the active infrared sensor to emit an infrared pulse signal to the induction area. If there is no obstacle in the induction area, the active infrared sensor will not output signal and because the microcontroller does not receive output signal from the active infrared sensor, the microcontroller will switch off the power source of the active infrared sensor and reenter the sleep state. After a preset time of sleeping, the watchdog timer disposed in the microcontroller will wake up the microcontroller and turn it back into the working state. The induction trash can circuit under the standby state will repeat the above procedure.

According to an embodiment of the present invention, the preset time is between 100 ms and 500 ms.

According to an embodiment of the present invention, the preset threshold time is between 2 ms and 50 ms.

According to an embodiment of the present invention, the induction area is above the induction window that is located on the front can edge of the trash can.

Contrasting to the conventional technology, the method provided by the present invention has the following advantages: the standby current of the induction trash is greatly reduced, the battery life is extended, an excellent power-saving effect is achieved, the use cost of the user is reduced, and pollution caused by used batteries can be decreased.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
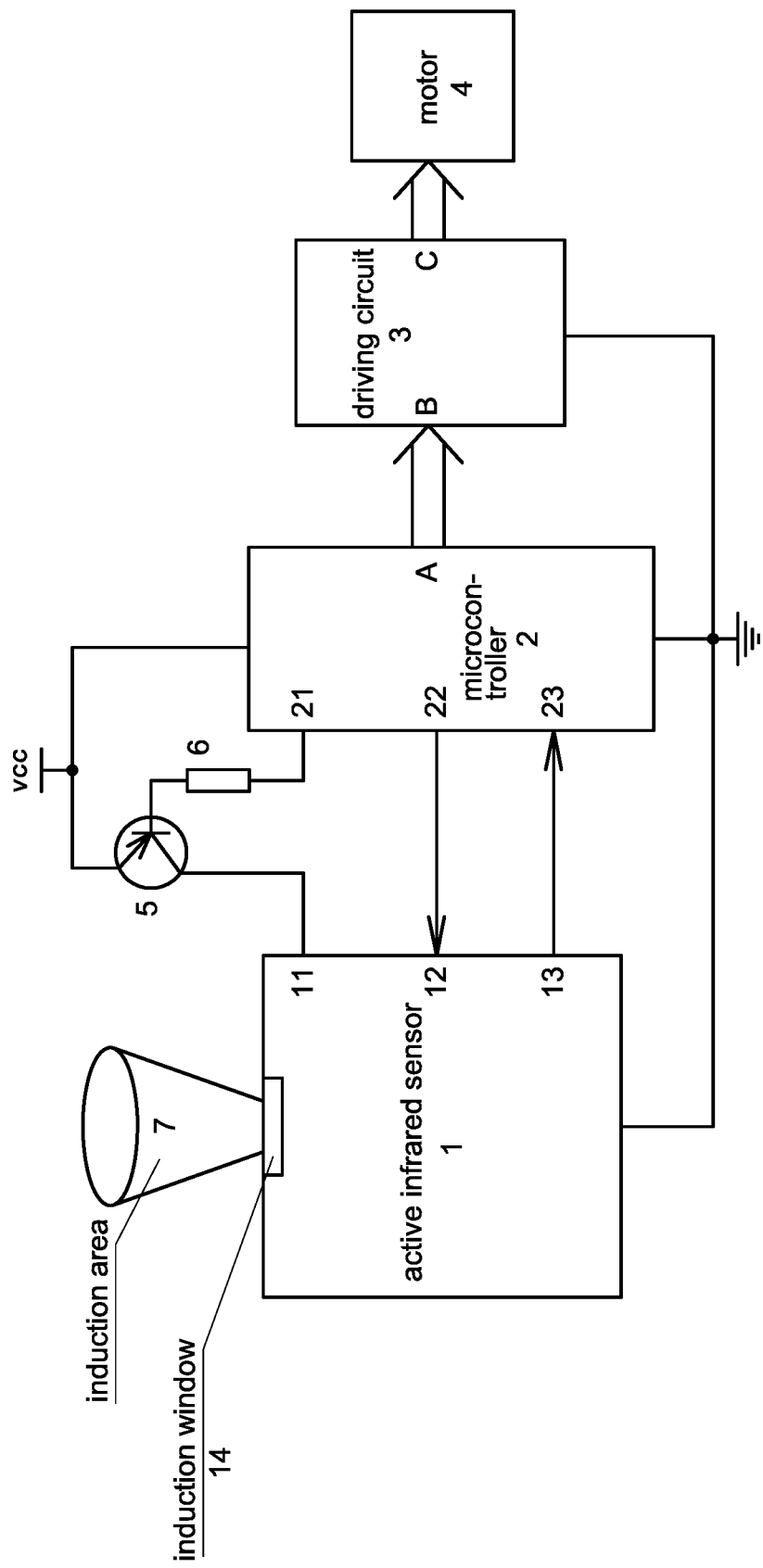
FIG. 1 is a block diagram of the circuit of a standby power-saving method of the induction trash can circuit according to the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The technology of the present invention will be described in detail with the illustration of the drawings.

The present invention provides a standby power-saving method for induction trash can circuit. The induction trash can circuit comprises an active infrared sensor, a microcontroller, a driving circuit, a motor to open and close the lid. The microcontroller has a sleep function and a watchdog timer. The emission of the infrared pulse of the active infrared sensor is controlled by the microcontroller. The output port of the active infrared sensor is connected to the microcontroller. The power-saving method is embodied as follows.

When the induction trash can circuit is in a standby state, the microcontroller controls the active infrared sensor to emit an infrared pulse signal to the induction area. If there is no obstacle in the induction area, the active infrared sensor will not output signal. Because the microcontroller does not receive any output signal from the active infrared sensor, it will enter a sleep state. After it has slept for a preset time, the watchdog timer disposed in the microcontroller will wake up the microcontroller, so as to have the microcontroller reenter the working state and repeat the above procedure under the standby state. On the other hand, if there is an obstacle in the induction area, the active infrared sensor will output a signal. The microcontroller received the output signal from the active infrared sensor will remain in the working state and conduct the following process: utilizing the driving circuit to drive the motor to rotate forward, delaying for a few seconds after the motor has driven the lid to open, controlling the driving circuit to drive the motor to rotate backward, reentering the sleep state after the lid is closed.

The working principle of the active infrared sensor is to have the sensor emit infrared detection signal to the induction area and if the infrared hits an obstacle and is reflected, the weak reflected signal will be amplified, compared, and output by the sensor. The power consumption of an active infrared sensor is usually around 0.03 mA-0.6 mA, based on the electricity consuming index of the chip utilized in the active infrared sensor. The lower the electricity consuming index of the chip is, the higher the price thereof will be. The power consumption of the microcontroller is usually around 1.3 mA under working state and below 1 µA under sleep state (which is negligible). Without utilizing the above technology, the standby current of the entire circuit of the induction trash can will be 1.33 mA~1.90 mA. Nevertheless, by utilizing the above technology of the present invention, if the operating time of the microcontroller under standby state is disposed as 5 ms (time for emitting and receiving infrared pulse) and the sleep time is disposed as 300 ms (time for the watchdog timer (WDT) to wake it up), the average power consumption of the microcontroller will approximately be 5/300*1.3 mA≈0.022 mA and the standby current of the entire circuit of the induction trash can will be 0.052 mA~0.622 mA. Therefore, its daily standby power consumption will approximately be 1.248 mAh~14.93 mAh. If it is utilized for 20 times a day, the daily action power consumption will be 2.2 mAh. Hence, the daily total power consumption will be 3.45 mAh~17.13 mAh. If an AA zinc-carbon battery, which capacity is 480 mAh, is utilized, it can work for 28~139 days theoretically. By utilizing an expensive power-saving chip in the active infrared sensor, the 139 day service life can completely satisfy the real demand. If an AA alkaline battery, which capacity is 1400 mAh, is utilized, it can work for 81~405 days theoretically.

Further, the power-saving method of the present invention may also utilize the following means.

The power source and supply of the active infrared sensor is controlled by the microcontroller. When the microcontroller enters the sleep state, it will cut off the power supply of the active infrared sensor. Besides, when the induction trash can circuities under the standby state:

When the microcontroller is woken up by the watchdog timer, the microcontroller will first restore the power supply of the active infrared sensor and delay for a preset threshold time for the active infrared sensor to enter a stable working state and then control the active infrared sensor to emit an infrared pulse signal to the induction area. If there is no obstacle in the induction area, the active infrared sensor will not output signal and because the microcontroller does not receive output signal from the active infrared sensor, the microcontroller will switch off the power source of the active infrared sensor and reenter the sleep state. After a preset time of sleeping, the watchdog timer disposed in the microcontroller will wake up the microcontroller and turn it back into the working state. The induction trash can circuit under the standby state will repeat the above procedure.

An advantage of this method is to allow the active infrared sensor be in the working state intermittently, so as to further reduce the standby current of the induction trash can. Besides, it does not require high electricity consuming index chip utilized in the active infrared sensor, such that the cost on the chip can be lowered and the total cost of the entire product can be reduced. Based on the above technology of the present invention, when the microcontroller is woken up by the watchdog timer (WDT), it will first power on the active infrared sensor and delay for an extremely short time, 8 ms. If the operating time of the microcontroller is disposed as 13 ms and the sleep time is disposed as 300 ms, the average power consumption of the active infrared sensor will be [(0.03 mA-0.01 mA)~(0.6 mA-0.01 mA))*13/300+ 0.01 mA~0.011 mA~0.036 mA (the 0.01 mA in the equation is the average current for emitting an infrared pulse). The average power consumption of the microcontroller will approximately be 13/300*1.3 m/A~0.056 mA. The standby current of the entire circuit of the induction trash can will be 0.067 mA~0.092 mA. The daily standby power consumption will approximately be 1.61 mAh~2.21 mAh. If the operation frequency is 20 times a day, the daily action power consumption will be 2.2 mAh. Hence, the daily total power consumption will be 3.81 mAh~4.41 mAh. If an AA zinc-carbon battery, which capacity is 480 mAh, is utilized, it can work for 109~126 days. Based on the above theoretical calculation, even if a high electricity consuming index chip (which is cheap) is utilized in the active infrared sensor, it can also work for 109 days, which can totally satisfy the real demand. Moreover, if an AA alkaline battery, which capacity is 1400 mAh, is utilized, it can work for 317~367 days theoretically.

The preset time is between 100 ms and 500 ms. The preset threshold time is between 2 ms and 50 ms.

The induction area is above the induction window that is located on the front can edge of the trash can.

An implementation of the present invention is illustrated as follows.

Figure 2:
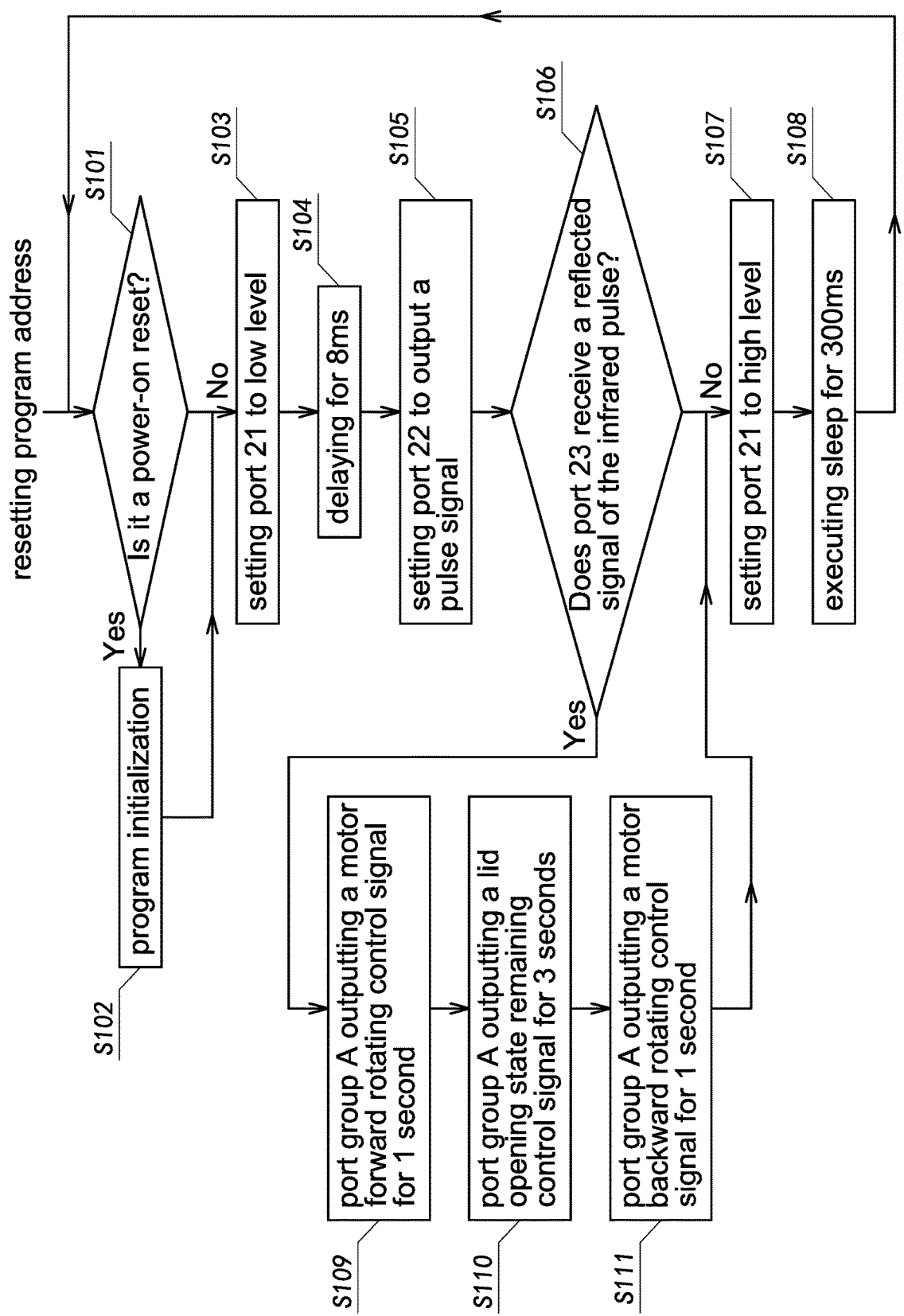
FIG. 2 is a flow diagram of the standby power-saving method of the induction trash can according to the present invention.

Referring to FIGS. 1 and 2, an induction trash can according to an embodiment of the present invention comprises an active infrared sensor 1, a microcontroller 2, a driving circuit 3, a motor 4, a PNP triode 5, and a current limiting resistor 6. The microcontroller 2 utilizes a chip with sleep function and watchdog timer (WDT). The power supply to the power port 11 of the active infrared sensor 1 is controlled by the output port 21 of the microcontroller 2. When the output port 21 of the microcontroller 2 is at high level, the base electrode of the PNP triode 5 will be at high level due to the resistor 6. Thus, the base electrode will not be connected and the triode 5 will be cut off, such that the power of the active infrared sensor 1 will be cut off. When the output port 21 of the microcontroller 2 is at low level, the base electrode of the PNP triode 5 will be connected due to the current limiting resistor 6. Thus, the triode 5 will be in saturation, so as to connect the power source to the power port 11 of the active infrared sensor 1. When the microcontroller 2 in a sleep state is woken up by the watchdog timer (WDT), it will first dispose the output port 21 to low level, so as to connect the active infrared sensor 1 to the power source Vcc. Then it will delay for 8 ms to allow the circuit of the active infrared sensor 1 become stable. Next, it will, through the output port 22, control the active infrared sensor 1 to emit an infrared pulse signal to the induction area 7. If there is no obstacle in the induction area 7, the output port 13 of the active infrared sensor 1 will be at low level (i.e. no output signal) and the input port 23 of the microcontroller 2 will consequently be at low level (i.e. no input signal). Since the input port 23 of the microcontroller 2 does not receive any reflection signal of the infrared pulse, the program of the microcontroller 2 will turn port 21 into high level immediately, so as to cut off the power source of the active infrared sensor 1 through the resistor 6 and the triode 5 and then enter the sleep state. After 300 ms of sleep, the watchdog timer (WDT) in the microcontroller 2 will wake up the microcontroller 2 to return to the working state and repeat the above procedure under the standby state. If there is an obstacle in the induction area 7, the output port 13 of the active infrared sensor 1 will be at high level (i.e. an output signal) and the input port 23 of the microcontroller 2 will consequently be at high level (i.e. an input signal). Since the input port 23 of the microcontroller 2 has received a reflection signal of the infrared pulse, the program of the microcontroller 2 will remain in the working state rather than enter the sleep state after received the output signal of the active infrared sensor 1. Then the microcontroller 1 will utilize the output port group A to control the input port group B of the driving circuit to have the driving circuit 3 to utilize the output port group C to drive the motor 4 to rotate forward, such that the motor 4 will bring the lid to open and delay for 3 seconds. Next, the microcontroller 1 will control the driving circuit 3 again to drive the motor 4 to rotate backward to close the lid. Then the microcontroller 2 will reenter the standby state. (The control of the driving circuit is prior art, which detail will therefore not be repeated in the disclosure of the present embodiment.)

The standby current of the entire circuit of a conventional induction trash can under the standby state is about 1.5 mA, while standby current of the entire circuit of the induction trash can according to the present invention under the standby state is about 0.067 mA~0.092 mA, which has been reduced by 22~16 times.

FIG. 2 illustrates a flow diagram of the program of the microcontroller 1 for the standby power-saving method of the induction trash can according to an embodiment of the present invention. After the microcontroller 2 is powered on, the application program disposed in the microcontroller 1 will execute the following steps:

Step S101 (either powering on or waking up will trigger this step): carrying on to Step S102 for program initialization if powering on, or carrying on to Step 103 if waking up from sleep.

Step S102: initializing the program, comprising the following procedures: disposing the port 21 as an output port and into 1 (high level), disposing the port 22 as an output port and into 0 (low level), disposing the port 23 as an input port, disposing the port group A as an output port, controlling the driving circuit not to work, so that the motor will not turn.

Step S103: disposing the port 21 into 0 (low level), so as to connect the active infrared sensor 1 and the power source Vcc.

Step S104: delaying for 8 ms, for stabilizing the circuit of the active infrared sensor 1.

Step S105: outputting a pulse signal from port 22 to control the active infrared sensor 1 to emit an infrared pulse signal to the induction area 7.

Step S106: determining if port 23 has received a reflection signal of the infrared pulse, so as to execute Step S107 if not received or to execute Step S109 if received.

Step S107: disposing the port 21 into 1 (high level), so as to cut off the power source of the active infrared sensor 1.

Step S108: executing sleep procedure for 300 ms and executing Step S101 after being woken up.

Step S109: controlling the driving circuit through the output port group A to make the driving circuit 3 drive the motor 4 to rotate forward for 1 second.

Step S110: controlling the driving circuit through the output port group A to make the driving circuit 3 stop the motor 4 from rotating and hold it for 3 seconds.

Step S111: controlling the driving circuit through the output port group A to make the driving circuit 3 drive the motor 4 to rotate backward for 1 second and executing Step S107.

Figure 3:
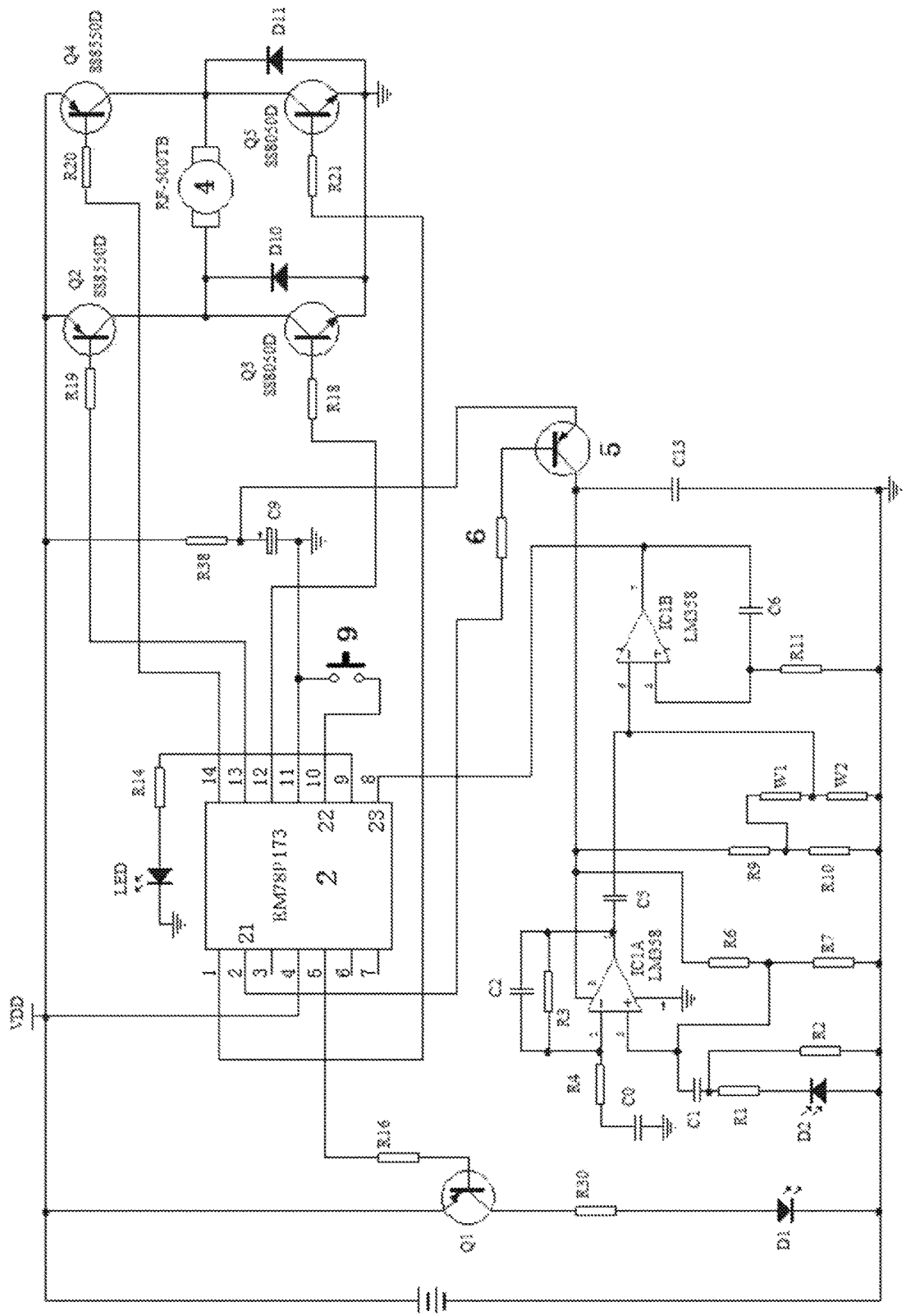
FIG. 3 is a circuit diagram of the standby power-saving method of the induction trash can according to the present invention.

FIG. 3 illustrates a specific circuit diagram for the above embodiment according to the present invention, which is constructed by the components comprising: a dual operational amplifier IC1 (model LM358), an infrared emitting diode D1, an infrared receiving diode D2, a triode Q1, capacitors C0, C1, C2, C5, C6, C13, and resistors R1, R2, R3, R4, R6, R7, R9, R10, W1, W2, R11, R16, and R30. The microcontroller 2 is embodied as model EM78P153 microcontroller. The driving circuit 3 is constructed by the components comprising: PNP triodes Q2 and Q4 (model SS8550D), NPN triodes Q3 and Q5 (model SS8050D), diodes D10 and D11, and resistors R18, R19, R20, and R21. The motor 4 is embodied as model RF-500TB permanent magnet DC motor. The R38 and C9 are utilized for power filtering purpose.

Referring to FIGS. 2 and 3, the working principle includes the following. When the microcontroller 2 is powered on, it will execute Step S101 and turns to Step S102 to conduct program initialization, comprising: disposing the port 21 (the second pin of the microcontroller 2) as an output port and into high level, cutting off the PNP triode 5, such that the power source of the active infrared sensor 1 will be cut off by the PNP triode 5, disposing the port 22 (the fifth pin of the microcontroller 2) as an output port and into high level, cutting off the triode Q1, so that the infrared emitting diode D1 will not emit signal, disposing the port 23 (the eighth pin of the microcontroller 2) as an input port, disposing the port group A (the first, 12th, 13th, and 14th pins of the microcontroller 2) as an output port, wherein the first and 12th pins are in low level, while the 13th and 14th pins are in high level, cutting off the triodes Q2-Q5, such that the driving circuit 3 will not work and the motor will not turn. Then Step S103 will be executed, which includes: disposing the second pin of the microcontroller 2 to low level, activating the PNP triode 5, and filtering power through R38 and C9 and providing power to the active infrared sensor 1. Next, Step S103 will be executed, which includes: delaying for 8 ms to stabilize the circuit of the active infrared sensor 1, so as to carry on executing Step S105: outputting a negative pulse signal through the fifth pin of the microcontroller 2, so that the infrared emitting diode D1 emits a infrared pulse signal to the induction area 7. Then the program will carry on executing Step S106 to determine whether the port 23 of the microcontroller (the eighth pin of the microcontroller 2) has received a reflection signal of the infrared pulse. If the eighth pin of the microcontroller 2 is at low level, which indicates that no reflection signal of the infrared pulse has been received, the program will execute Step S107, while if it is at high level, which indicates that a reflection signal of the infrared pulse has been received, the program will execute Step S109. The working principles regarding the active infrared sensor 1 constructed by the peripheral elements and LM358 are in the prior art, which would not be repeated here. The Step S107 includes disposing the port 21 (the second pin) of the microcontroller to high level, so as to cut off the power supply of the active infrared sensor 1. Then it carries on to Step 108 to execute sleep procedure for 300 ms and carries on to Step 101 after wakeup. If there is a reflection signal, Step S109 will be executed, which comprises disposing the first and 14th pins of the port group A of the microcontroller 2 to high level and disposing the 12th and 13th pins of the microcontroller 2 to low level, such that Q2 and Q5 will be connected and Q3 and Q4 will be cut off, rendering the motor 4 to rotate forward for 1 second to open the lid. Then, Step S110 will be executed, which comprises disposing the first, 12th, 13th, and 14th pins of the port group A of the microcontroller 2 to high level, so as to connect the Q3 and Q5 and cut off the Q2 and Q4, such that the motor will lose power, but remain in a braked state (because Q3 and Q5 are connected and the diodes D10 and D11 form the forward and backward circuits of the motor, therefore the lid will not fall easily due to the gravity), wherein the lid opening state will be held for 3 seconds. Next, Step S111 will be executed, which comprises disposing the first and 14th pins of the port group A of the microcontroller 2 to low level and disposing the 12th and 13th pins of the port group A of the microcontroller 2 to high level, such that Q4 and Q3 will be connected and Q2 and Q5 will be cut off, rendering the motor 4 to rotate backward for 1 second to close the lid. Then the program will turn to the Step S107 to return to the standby state.

The part of the embodiments that has not been described is the same as prior art.

One skilled in the art will understand that the embodiment of the present invention as shown in the drawings and described above is exemplary only and not intended to be limiting.

What is claimed is:

1. A power-saving method for an induction trash can circuit, comprising the steps of:
    controlling an active infrared sensor to emit an infrared pulse signal to an induction area by a microcontroller in a standby state;
    setting a microcontroller into a sleep state if no reflection output signal is received from the active infrared sensor, wherein in the standby state, the microcontroller controls the active infrared sensor to emit the infrared pulse signal, wherein in the sleep state, the microcontroller cuts off a power of the active infrared sensor; or
    remaining the microcontroller in a working state if a reflection output signal is received from the active infrared sensor and controlling a driving circuit to drive a motor to rotate forward to open a lid of the induction trash can, delaying for a few seconds after the motor has driven the lid to open, controlling the driving circuit to drive the motor to rotate backward to close the lid, and setting the microcontroller into the sleep state after the lid is closed; and
    after a preset time, via a watchdog timer, waking up the microcontroller from the sleep state to the working state, so as to have the microcontroller reenter the working state and repeat the above steps under the standby state.

2. The power-saving method, as recited in claim 1, further comprising the steps of:
    cutting off the power supply of the active infrared sensor when the microcontroller enters the sleep state; and
    restoring the power supply of the active infrared sensor, delaying for a preset threshold time for the active infrared sensor to enter a stable working state, and controlling the active infrared sensor to emit the infrared pulse signal to the induction area when the microcontroller is in the standby state.

3. The power-saving method, as recited in claim 1, wherein the preset time is between 100 ms and 500 ms.

4. The power-saving method, as recited in claim 2, wherein the preset time is between 100 ms and 500 ms.

5. The power-saving method, as recited in claim 2, wherein the preset threshold time is between 2 ms and 50 ms.

6. The power-saving method, as recited in claim 4, wherein the preset threshold time is between 2 ms and 50 ms.

7. The power-saving method, as recited in claim 1, wherein the induction area is arranged above the induction window that is located on the front can edge of the trash can.

8. The power-saving method, as recited in claim 2, wherein the induction area is arranged above the induction window that is located on the front can edge of the trash can.

9. The power-saving method, as recited in claim 3, wherein the induction area is arranged above the induction window that is located on the front can edge of the trash can.

10. The power-saving method, as recited in claim 4, wherein the induction area is arranged above the induction window that is located on the front can edge of the trash can.

11. The power-saving method, as recited in claim 5, wherein the induction area is arranged above the induction window that is located on the front can edge of the trash can.

12. The power-saving method, as recited in claim 6, wherein the induction area is arranged above the induction window that is located on the front can edge of the trash can.

* * * * *